(12) United States Patent
Moss

(10) Patent No.: US 6,987,631 B2
(45) Date of Patent: Jan. 17, 2006

(54) DATA READ/WRITE METHOD AND APPARATUS

(75) Inventor: Darren Glen Moss, Roy, UT (US)

(73) Assignee: Iomega Corporation, San Diego, CA (US)

( * ) Notice: Subject to any disclaimer, the term of this patent is extended or adjusted under 35 U.S.C. 154(b) by 159 days.

(21) Appl. No.: 10/382,662

(22) Filed: Mar. 5, 2003

(65) Prior Publication Data

US 2004/0095664 A1    May 20, 2004

Related U.S. Application Data

(60) Provisional application No. 60/426,889, filed on Nov. 15, 2002.

(51) Int. Cl.
  *G11B 27/36*   (2006.01)
  *G11B 5/09*    (2006.01)

(52) U.S. Cl. .......................... 360/31; 360/39; 360/48; 360/55; 360/57; 360/58; 360/69; 360/75; 360/78.04; 369/30.23; 369/53.15; 369/53.24; 369/53.1; 369/53.41

(58) Field of Classification Search .................. 360/39, 360/48, 31, 55, 57–58, 60, 62; 365/189.01, 365/189.05, 230.08, 40; 369/30.23, 53.15, 369/53.24; 714/30, 25, 48, 6; 711/114
See application file for complete search history.

(56) References Cited

U.S. PATENT DOCUMENTS

| 4,725,899 A * | 2/1988 | Gardner ...................... 360/15 |
| 6,510,114 B1 * | 1/2003 | Yeo et al. ................... 369/53.2 |
| 6,717,758 B2 * | 4/2004 | Adams et al. ............... 360/31 |

FOREIGN PATENT DOCUMENTS

| JP | 05-081679 | * 4/1993 |
| JP | 10-124930 | * 5/1998 |

OTHER PUBLICATIONS

Toigo, "Avoiding a Data Crunch," Scientific American, May 2000, pp. 57, 59-61, 64-67 and 70-74.*

* cited by examiner

*Primary Examiner*—David Hudspeth
*Assistant Examiner*—Natalia Figueroa
(74) *Attorney, Agent, or Firm*—James T. Hagler

(57) ABSTRACT

An apparatus and method of reading and writing data from and to a data storage device is provided. One method of practicing the present invention comprises placing, or leaving an unused track, row or column adjacent to a medium track containing apparatus information. Another method of practicing the present invention comprises placing, or leaving an unused track, row or column adjacent to both sides of the medium track containing the apparatus information.

16 Claims, 2 Drawing Sheets

DATA READ/WRITE METHOD AND APPARATUS

Priority is claimed to U.S. Provisional Application No. 60/426,889, filed Nov. 15, 2002, entitled: "Data Read/Write Method and Apparatus," which is referred to and incorporated herein in its entirety by this reference.

FIELD OF THE INVENTION

The present invention generally relates to data storage devices. More particularly, the invention concerns a method and apparatus of writing and reading data to and from a data storage medium.

BACKGROUND OF THE INVENTION

Data storage devices, such as magnetic or optical storage media, are employed to store digital information. In some instances, apparatus information relating to the status of the storage medium or the reading device is stored on the medium itself. For ease of reference in this application this type of information will be referred to as "apparatus" or "vital" or "z-track" information. Despite that shorthand definition, it should be understood the apparatus information may include information both about any of, or any combination of one or more storage devices, one or more storage media, and any other computing device.

In a known system, the medium serial number is stored on the medium, instead of on another, associated data storage device.

However, storage devices that use elements for reading and another for writing, such as read-write heads, introduce the possibility that the apparatus information is not written along the center of a track. Generally speaking it is understood this may occur because of the physical offset between the read and write elements of the read-write heads. In some cases, the apparatus information may not be written within an acceptable range of the desired medium track location, and thereby become unreadable. When this occurs, the information is lost, which can negatively affect the reliability and performance of the data storage device.

In addition, although storage devices may be calibrated to write in the same location from which they can subsequently read-back, the physical offset between the read and write elements on the read-write head make it conceivable that the vital tracks maybe over-written by neighboring tracks. Moreover, the interchanging of removable media from a data storage device can decrease the reliability of z-track reading and writing.

Therefore, there exists a need for a data storage device that can reliably record and retrieve apparatus information.

SUMMARY OF THE INVENTION

The present invention alleviates to a great extent the disadvantages of conventional data storage devices by providing an apparatus and method for reliably writing and reading data to and from the data storage device.

One embodiment of the present invention comprises positioning one or more unused buffer regions adjacent to one side of the region containing the apparatus information. Another method of practicing the present invention comprises positioning an unused buffer region adjacent to both sides of the track containing the apparatus information. It should be understood that "region" as used in this description refers to any physical or logical divisions or areas of an information storage medium, such as for example, tracks, rows, columns, etc.

These and other features and advantages of the present invention will be appreciated from review of the following detailed description of the invention, along with the accompanying figures in which like reference numerals refer to like parts throughout.

It will be recognized that some or all of the Figures are schematic representations for purposes of illustration and do not necessarily depict the actual relative sizes or locations of the elements shown.

DETAILED DESCRIPTION OF THE INVENTION

In the following paragraphs, the present invention will be described in detail by way of example with reference to the accompanying drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the invention throughout this document does not mean that all claimed embodiments or methods must include the referenced feature(s).

The invention relates to information storage devices and media, such as for example magnetic or optical media and devices. In one embodiment, a drive with a removable medium is provided and in others fixed drives are provided. One application is for use in digital cameras or digital movie cameras. Other examples of applications include PDAs (personal digital assistants), laptop computers, notebook computers, other portable electronic devices, desktop computers and storage media libraries.

Data storage media or other devices often store apparatus or vital information, such as the medium serial number, locations of medium defects, head-medium calibration(s) and other vital information, on the storage medium itself. These media can be formatted for data storage, such as into a plurality of tracks, rows, columns or other region designators. One or more entire medium regions, are dedicated to the storage and retrieval of the vital information, or as defined above, the apparatus, vital or z-track information. Such regions on the medium will be referred to as "z-tracks". The term "track" will be used to refer to any type of region on media.

Figure 1:
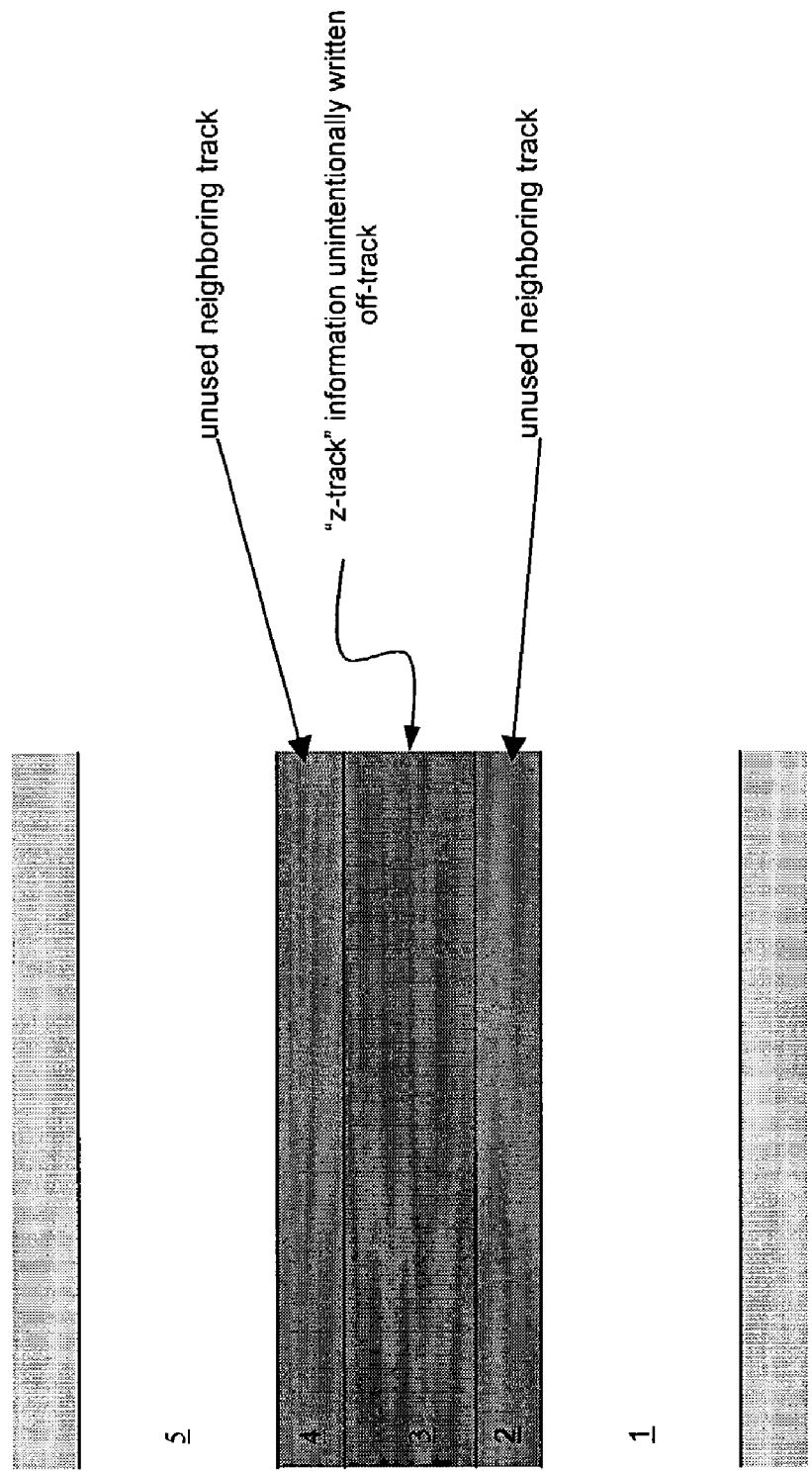
FIG. 1 is an illustration of a section of a data storage medium showing five disk regions constructed according to one embodiment of the present invention.

One embodiment of the present invention places, or leaves, at least one unused region (such as track, row or column, depending on media geometry) between the z-track and neighboring tracks. Any number of such unusual regions maybe selected. Referring to FIG. 1, which illustrates an example of a section of a data storage medium, if the z-track is located on medium track 3, then tracks 2 and 4 would be unused or buffers and tracks 1 and 5 would be available for use. Although a single region is illustrated in each of these "tracks" it should be understood that plural tracks or other regions may be present in the areas designated in FIG. 1 with reference numerals 1, 2, 3, 4, and 5. In this example, if information on track 1 or 5 was accidentally written off-center, there is at least one track space (2 or 4) between it and the apparatus information on the z-track. This region of separation greatly reduces the probability that the z-track information would be over-written. It should be appreciated that the z-track can be located on other tracks and any number of separating tracks can be used.

Another embodiment of the present invention includes placing, or leaving a desired number of unused track(s) on only one side of the z-track. The chosen side may be determined by the propensity of the read-write head to write to a specific side of a track. Another embodiment of the present invention includes two, or more, unused tracks on each side of the z-track.

A preferred embodiment of the present invention comprises machine readable code, or computer software, that directs a computing device or devices to write data on a data storage medium and not write data in the region adjacent to the written data. As described above, the apparatus information, or any other type of information or data of interest, may be written to a data storage medium in a region such as a track, row, or column. A corresponding adjacent region (such as a track, row, or column) is left intentionally blank or at minimum not purposely written. An alternative embodiment of computer implementable instructions constructed according to the present invention would instruct the computing device or devices to write data in a region and also instruct the computer to leave the region on either side of the written region blank. In this way the vital z-track or any other type of information of interest can be read regardless of whether or not the information is written along the center of a region or written off-center of a region.

Figure 2:
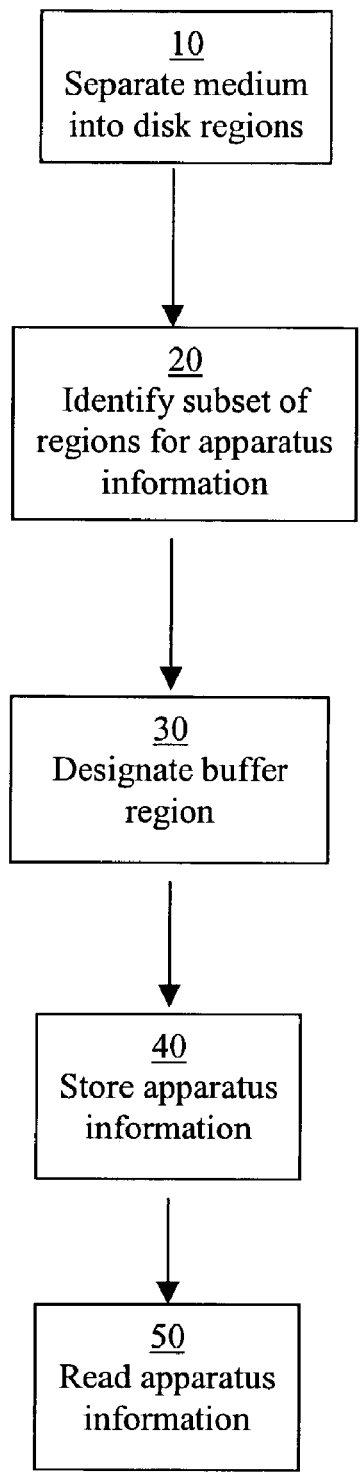
FIG. 2 is a flow chart illustrating one method of practicing the present invention.

Referring to FIG. 2, one method of practicing the present invention is illustrated. In step 10, the selected medium is organized into regions. The medium may include any form of information storage media, such as for example, a digital data storage medium, a magnetic medium, an optical medium, a computer hard disk, or removable disk, or other suitable media. The regions may correspond to physical or logical divisions, such as for example, tracks, rows, columns, etc. In step 20, one or more specific regions are identified as the regions in which the apparatus information will be or has been stored. An example of such a region is illustrated as region 3 in FIG. 1. In a preferred embodiment, the apparatus information storage region(s) contain any desired information pertaining to hardware or media, such as z-track information, information relating to a status of the data storage medium, information relating to a status of a reading device for reading the written data, a data medium serial number, a location of a data storage medium defect, information relating to a read/write head-medium calibration, or other information of interest. In step 30, one or more buffer regions are designated. These region(s) preferably are adjacent the apparatus regions identified in step 20. In FIG. 1, examples of such buffer regions are illustrated as regions 2 and 4. The buffer regions may be located along only one side of the apparatus regions, or they may be located along both sides of the apparatus regions, as illustrated in FIG. 1. In step 40, the data reading/writing assembly of the data storage device containing the medium (or media) stores the apparatus information onto the medium (or media) at the desired region. In an example of a data storage device, the data writing assembly includes a read/write head. In step 50, the data reading/writing assembly reads the apparatus information from the medium. Of course, numerous operations optionally may be conducted by the data reading/writing assembly between steps 40 and 50. Likewise, separate assemblies may be used for reading and writing. The machine readable code may be stored in any type of storage media, such as floppy disk, magnetic tape, hard drive, Iomega ZIP® disk, Iomega JAZZ® disk, optical disk, RAM, ROM, EPROM, flash memory etc.

In an example, there is a possibility that the z-track information may be written off-center of the intended track. Should that occur, z-track information can be read in either direction, and not be interfered by data written on the neighboring regions (such as regions 1 and 5 illustrated in FIG. 1). In a preferred embodiment of the present invention, z-track information that is written 50% or more off the center of the intended region would be readable, although smaller or larger deviations are readable as well. For example, referring to FIG. 1, the z-track reads may be made halfway, or more, between tracks 2 and 3 and halfway, or more, between tracks 3 and 4.

The z-track spacing method of the present invention allows for the possibility that the physical offset of the write element with respect to the read element on a read-write head can cause off-center writes. In a preferred embodiment, one track of separation will be sufficient for typical configurations of the read and write elements. Other embodiments of the present invention may comprise two or more tracks of separation. On feature of the present invention is that if the z-track in question was accidentally written off-center, the z-track spacing method allows subsequent z-track read attempts to retry over a greater physical range of the track, thereby increasing the probability that the important z-track information will be retrieved.

Thus, it is seen that an apparatus and a method of reading and writing to a data storage device is provided. One skilled in the art will appreciate that the present invention can be practiced by other than the above-described embodiments, which are presented in this description for purposes of illustration and not of limitation. The description and examples set forth in this specification and associated drawings only set forth preferred embodiment(s) of the present invention. The specification and drawings are not intended to limit the exclusionary scope of this patent document. Many designs other than the above-described embodiments will fall within the literal and/or legal scope of the following claims, and the present invention is limited only by the claims that follow. It is noted that various equivalents particular embodiments discussed in this description may practice the invention as well.

What is claimed is:

1. A method of writing data to a data storage medium including regions, the method comprising:
    identifying a apparatus information storage region on said data storage medium;
    designating at least one buffer region adjacent said apparatus information storage region; and
    wherein said apparatus information is written off-center in said apparatus information storage region, and at least partially is written to said at least one buffer region.

2. The method of claim 1 wherein said step of designating at least one buffer region includes designating at least one buffer region on a first side of said apparatus information storage region and at least one buffer region on a second side of said apparatus information storage region.

3. The method of claim 1 further comprising designating a plurality of data storage regions on the side of each of said at least one buffer region on an opposite side of said at least one buffer region from said apparatus information storage region.

4. The method of claim 1 further comprising writing apparatus information to said apparatus information storage region.

5. The method of claim 4 further comprising reading said apparatus information from said apparatus information storage region.

6. The method of claim 1 further comprising reading said apparatus information from said apparatus information storage region and said at least one buffer region.

7. The method of claim 1, wherein the region is a track.

8. The method of claim 1, wherein the apparatus information is selected from a group consisting of: information relating to a status of the data storage medium, information relating to a status of a reading device for reading the written data, a data medium serial number, a location of a data storage medium defect, and information relating to a read/write head-medium calibration.

9. The method of claim 1, wherein the data storage medium is selected from a group consisting of: a magnetic medium, and an optical medium.

10. The method of claim 1 wherein the data storage medium comprises a flash memory.

11. An information storage medium formatted into a plurality of regions comprising:
   at least one region designated to store apparatus information;
   at least one region designated to store data, other than said apparatus information;
   at least one buffer region adjacent each of said regions designated to store apparatus information; and
   apparatus information written off-center in said apparatus information storage region, and at least partially is written to said at least one buffer region.

12. The information storage medium of claim 11 wherein a first one of said at least one buffer regions is positioned on a first side of said apparatus information storage region and a second one of said at least one buffer regions is positioned on a second side of said apparatus information storage region.

13. The information storage medium of claim 11 further comprising a plurality of data storage regions positioned on the side of each of said at least one buffer region opposite from said apparatus information storage region.

14. The information storage medium of claim 11 included in an information storage assembly further comprising a read/write assembly.

15. The information storage medium of claim 11, wherein each of said regions includes at least one track.

16. The information storage medium of claim 11, wherein the apparatus information is selected from a group consisting of: information relating to a status of the data storage medium, information relating to a status of a reading device for reading the written data, a data medium serial number, a location of a data storage medium defect, and information relating to a read/write head-medium calibration.

* * * * *